(12) United States Patent
Buhler et al.

(10) Patent No.: US 9,726,024 B2
(45) Date of Patent: Aug. 8, 2017

(54) AIRFOIL COOLING CIRCUIT

(71) Applicant: GENERAL ELECTRIC COMPANY, Schenectady, NY (US)

(72) Inventors: Jared Peter Buhler, Tewksbury, MA (US); Marshall Scott Allen, Amesbury, MA (US); Daniel Edward Demers, Ipswich, MA (US); Robert Francis Manning, Newburyport, MA (US)

(73) Assignee: General Electric Company, Schenectady, NY (US)

( * ) Notice: Subject to any disclaimer, the term of this patent is extended or adjusted under 35 U.S.C. 154(b) by 449 days.

(21) Appl. No.: 14/368,962

(22) PCT Filed: Dec. 21, 2012

(86) PCT No.: PCT/US2012/071385
§ 371 (c)(1),
(2) Date: Jun. 26, 2014

(87) PCT Pub. No.: WO2013/101761
PCT Pub. Date: Jul. 4, 2013

(65) Prior Publication Data
US 2014/0348636 A1    Nov. 27, 2014

(51) Int. Cl.
*F01D 5/18* (2006.01)
*F01D 9/02* (2006.01)
(52) U.S. Cl.
CPC .............. *F01D 5/188* (2013.01); *F01D 5/189* (2013.01); *F01D 9/02* (2013.01); *F05D 2250/185* (2013.01); *F05D 2260/201* (2013.01); *Y02T 50/676* (2013.01)

(58) Field of Classification Search
CPC ............. F01D 5/188; F01D 5/189; F01D 9/08
See application file for complete search history.

(56) References Cited

U.S. PATENT DOCUMENTS

| 3,628,885 A | * | 12/1971 | Sidenstick | .............. | F01D 5/189 |
|---|---|---|---|---|---|
| | | | | | 416/193 A |
| 3,891,348 A | | 6/1975 | Auxier | | |
| 5,387,085 A | * | 2/1995 | Thomas, Jr. | ............ | F01D 5/187 |
| | | | | | 415/115 |
| 5,484,258 A | | 1/1996 | Isburgh et al. | | |
| 5,488,825 A | | 2/1996 | Davis et al. | | |

(Continued)

FOREIGN PATENT DOCUMENTS

| CN | 1776199 A | 5/2006 |
|---|---|---|
| CN | 1970997 A | 5/2007 |

(Continued)

OTHER PUBLICATIONS

Unofficial English Translation of Japanese Office Action issued in connection with corresponding JP Application No. 2014550414 on Jun. 30, 2015.

(Continued)

*Primary Examiner* — Woody Lee, Jr.
(74) *Attorney, Agent, or Firm* — General Electric Company; William Scott Andes

(57) ABSTRACT

An airfoil cooling circuit includes an impingement cooling circuit and a serpentine cooling circuit. An airfoil for use in a gas turbine engine having a cooling circuit which includes an impingement cooling circuit and a serpentine cooling circuit.

20 Claims, 5 Drawing Sheets

(56) References Cited

U.S. PATENT DOCUMENTS

| | | |
|---|---|---|
| 5,516,260 A | 5/1996 | Damlis et al. |
| 5,536,143 A | 7/1996 | Jacala et al. |
| 5,924,843 A | 7/1999 | Staub et al. |
| 6,132,174 A | 10/2000 | Staub et al. |
| 6,193,465 B1 | 2/2001 | Liotta et al. |
| 6,491,496 B2 | 12/2002 | Starkweather |
| 6,607,356 B2 | 8/2003 | Manning et al. |
| 7,007,488 B2 | 3/2006 | Orlando et al. |
| 7,168,921 B2 | 1/2007 | Honkomp et al. |
| 7,249,934 B2 | 7/2007 | Palmer et al. |
| 7,296,973 B2 | 11/2007 | Lee et al. |
| 7,377,747 B2 | 5/2008 | Lee |
| 7,445,432 B2 | 11/2008 | Levine et al. |
| 7,530,789 B1 | 5/2009 | Liang |
| 7,695,245 B1 * | 4/2010 | Liang ............ F01D 5/189 416/1 |
| 8,043,027 B2 | 10/2011 | Duroch et al. |
| 8,043,057 B1 | 10/2011 | Liang |
| 8,070,443 B1 * | 12/2011 | Liang ............ F01D 5/187 415/115 |
| 8,142,153 B1 * | 3/2012 | Liang ............ F01D 9/04 416/1 |
| 2004/0022630 A1 | 2/2004 | Tiemann |
| 2006/0005546 A1 | 1/2006 | Orlando et al. |
| 2006/0222495 A1 | 10/2006 | Liang |
| 2010/0040478 A1 | 2/2010 | Abdel-Messeh et al. |

FOREIGN PATENT DOCUMENTS

| | | |
|---|---|---|
| CN | 1995708 A | 7/2007 |
| CN | 201991569 U | 9/2011 |
| EP | 1065343 A2 | 1/2001 |
| EP | 0735240 B1 | 4/2001 |
| EP | 1621734 B1 | 8/2007 |
| JP | 2001207802 A | 8/2001 |
| JP | 2003083001 | 3/2003 |
| JP | 2003232204 A | 8/2003 |
| JP | 2003322002 | 11/2003 |
| JP | 2006342805 A | 12/2006 |

OTHER PUBLICATIONS

Unofficial English Translation of Chinese Office Action issued in connection with corresponding CN Application No. 201280065367.0 on Apr. 1, 2015.

Unofficial English Translation of Chinese Office Action issued in connection with corresponding CN Application No. 201280065367.0 on May 31, 2016.

International Search Report dated Mar. 14, 2013 which was issued in connection with PCT Patent Application No. US12/71385 which was filed on Dec. 21, 2012.

* cited by examiner

AIRFOIL COOLING CIRCUIT

BACKGROUND OF THE INVENTION

The technology described herein relates generally to cooling circuits for airfoils, and more particularly to such cooling circuits for use in turbine airfoils for gas turbine engines.

Many gas turbine engine assemblies include cooling circuits in rotating airfoils, such as high pressure or low pressure turbine blades, and/or non-rotating stationary airfoils, such as high pressure or low pressure turbine nozzles.

During operation, comparatively cooler air is supplied to the airfoil in order to maintain the temperature of the material from which the airfoil is made below the melting or softening temperature. Typically airfoils are cooled either by an impingement circuit, where the post impingement air flows axially out of the airfoil, or a serpentine circuit where the flow direction is primarily radial and cools by means of forced convection There remains a need for improved cooling circuits which will provide cooling to an airfoil in a robust and economical fashion.

BRIEF SUMMARY OF THE INVENTION

In one aspect, an airfoil cooling circuit includes an impingement cooling circuit and a serpentine cooling circuit.

In another aspect, an airfoil for use in a gas turbine engine having a cooling circuit which includes an impingement cooling circuit and a serpentine cooling circuit.

DETAILED DESCRIPTION OF THE INVENTION

Figure 1:
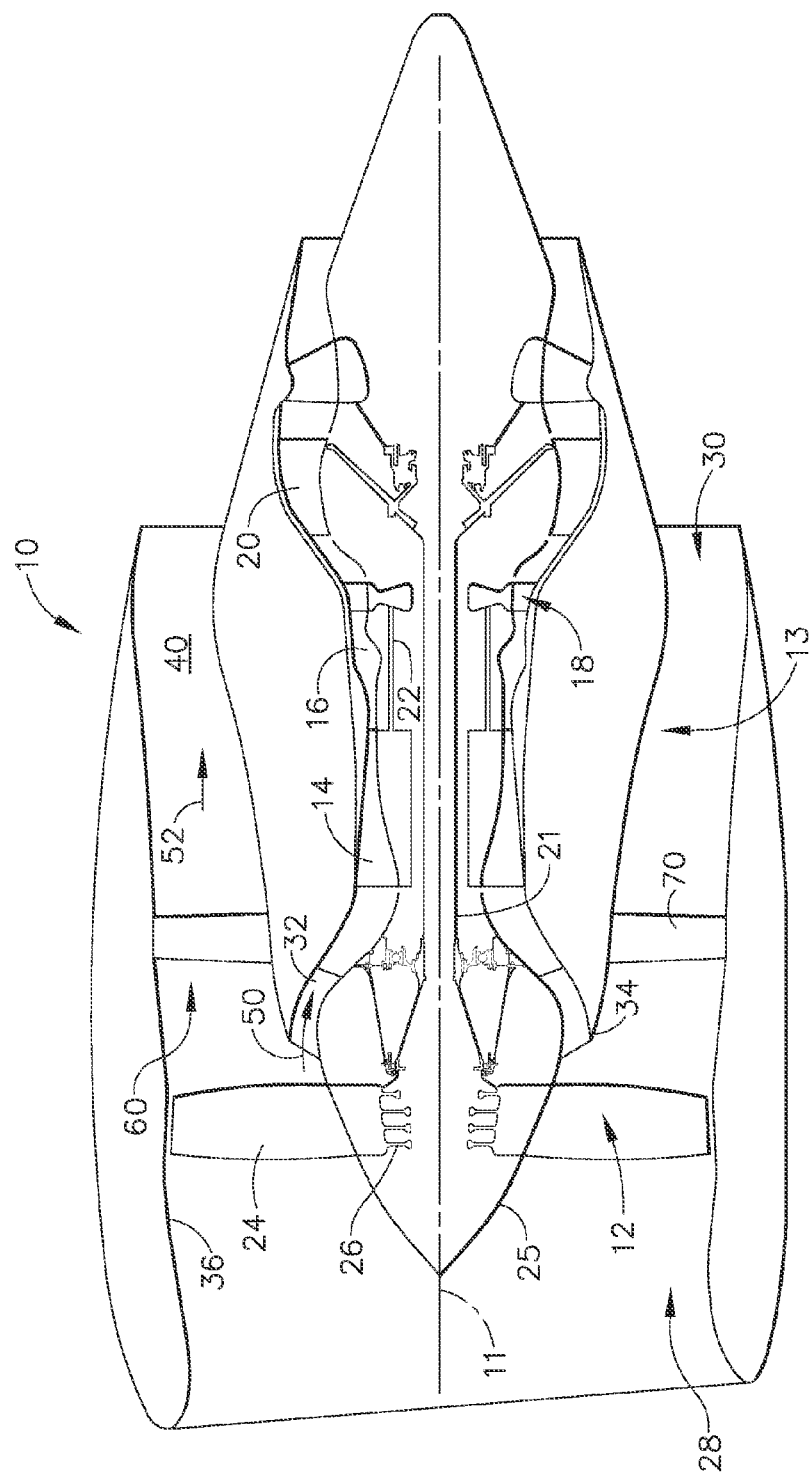
FIG. 1 is a cross-sectional illustration of an exemplary gas turbine engine assembly.

FIG. 1 is a cross-sectional schematic illustration of an exemplary gas turbine engine assembly 10 having a longitudinal axis 11. Gas turbine engine assembly 10 includes a fan assembly 12 and a core gas turbine engine 13. Core gas turbine engine 13 includes a high pressure compressor 14, a combustor 16, and a high pressure turbine 18. In the exemplary embodiment, gas turbine engine assembly 10 also includes a low pressure turbine 20, and a multi-stage booster compressor 32, and a splitter 34 that substantially circumscribes booster 32.

Fan assembly 12 includes an array of fan blades 24 extending radially outward from a rotor disk 26, the forward portion of which is enclosed by a streamlined spinner 25. Gas turbine engine assembly 10 has an intake side 28 and an exhaust side 30. Fan assembly 12, booster 22, and turbine 20 are coupled together by a first rotor shaft 11, and compressor 14 and turbine 18 are coupled together by a second rotor shaft 22.

In operation, air flows through fan assembly 12 and a first portion 50 of the airflow is channeled through booster 32. The compressed air that is discharged from booster 32 is channeled through compressor 14 wherein the airflow is further compressed and delivered to combustor 16. Hot products of combustion (not shown in FIG. 1) from combustor 16 are utilized to drive turbines 18 and 20, and turbine 20 is utilized to drive fan assembly 12 and booster 32 by way of shaft 21. Gas turbine engine assembly 10 is operable at a range of operating conditions between design operating conditions and off-design operating conditions.

A second portion 52 of the airflow discharged from fan assembly 12 is channeled through a bypass duct 40 to bypass a portion of the airflow from fan assembly 12 around core gas turbine engine 13. More specifically, bypass duct 40 extends between a fan casing or shroud 36 and splitter 34. Accordingly, a first portion 50 of the airflow from fan assembly 12 is channeled through booster 32 and then into compressor 14 as described above, and a second portion 52 of the airflow from fan assembly 12 is channeled through bypass duct 40 to provide thrust for an aircraft, for example. Splitter 34 divides the incoming airflow into first and second portions 50 and 52, respectively. Gas turbine engine assembly 10 also includes a fan frame assembly 60 to provide structural support for fan assembly 12 and is also utilized to couple fan assembly 12 to core gas turbine engine 13.

Fan frame assembly 60 includes a plurality of outlet guide vanes 70 that extend substantially radially between a radially outer mounting flange and a radially inner mounting flange and are circumferentially-spaced within bypass duct 40. Fan frame assembly 60 may also include a plurality of struts that are coupled between a radially outer mounting flange and a radially inner mounting flange. In one embodiment, fan frame assembly 60 is fabricated in arcuate segments in which flanges are coupled to outlet guide vanes 70 and struts. In one embodiment, outlet guide vanes and struts are coupled coaxially within bypass duct 40. Optionally, outlet guide vanes 70 may be coupled downstream from struts within bypass duct 40.

Fan frame assembly 60 is one of various frame and support assemblies of gas turbine engine assembly 10 that are used to facilitate maintaining an orientation of various components within gas turbine engine assembly 10. More specifically, such frame and support assemblies interconnect stationary components and provide rotor bearing supports. Fan frame assembly 60 is coupled downstream from fan assembly 12 within bypass duct 40 such that outlet guide vanes 70 and struts are circumferentially-spaced around the outlet of fan assembly 12 and extend across the airflow path discharged from fan assembly 12.

Figure 2:
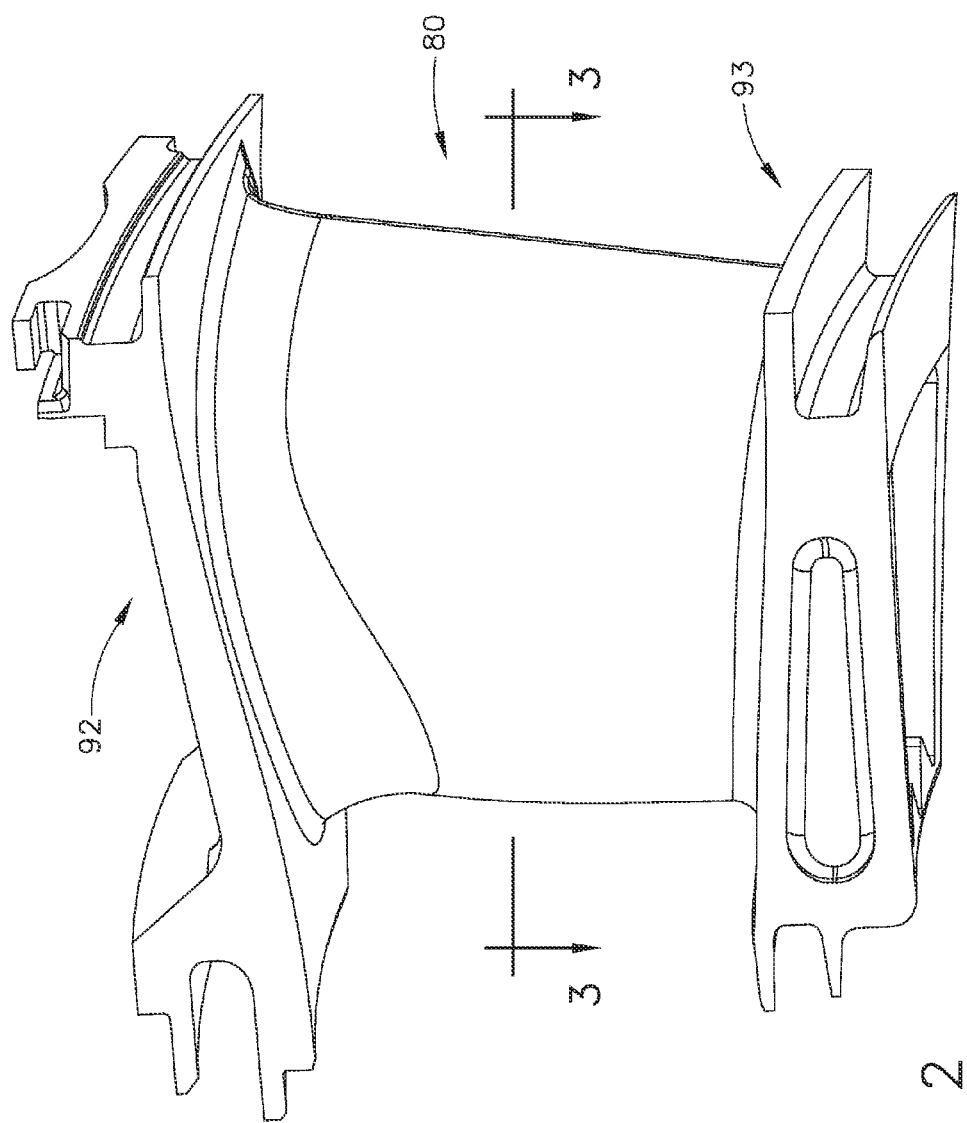
FIG. 2 is a perspective illustration of an airfoil with an exemplary cooling circuit.

FIG. 2 illustrates an exemplary airfoil 80 suitable for use in one of the turbines, high pressure turbine 18 or low pressure turbine 20, of gas turbine engine 10. In the embodiment shown in FIG. 2, the airfoil 80 is configured for use as a stationary airfoil such as a turbine nozzle or vane.

As shown in FIGS. 3-6, the airfoil 80 of FIG. 2 is provided with an airfoil cooling circuit 81 which combines two previously separate types of circuits. Those two types of circuits are employed by using an impingement insert 84 in the cavity 85 near the leading edge 86 of the airfoil 80 (see FIGS. 3 and 5) to form an impingement cooling circuit 82, and the remainder of the airfoil 80 is cooled by a serpentine circuit 83 using the post impingement air (see FIG. 4), which is cooling air remaining in the airfoil 80 after passing through the impingement cooling circuit 82. The insert 84 is sized and situated in the forward portion of the leading edge cavity 85 such that the post impingement air is channeled along the aft rib 89 of the cavity 85 thus minimizing the cross flow effect of the impingement cooling. Impingement cooling air exits the insert 84 through a plurality of impingement cooling holes 100 sized, shaped, and positioned to direct impingement air against the inner surface of the cavity 85 in the vicinity of the leading edge 86 of the airfoil 80.

Incoming cooling air 90 first enters the airfoil 80 through an inlet formed in the insert 84 near the tip 92 of the airfoil 80 and flows radially inward toward the tip 93 of the airfoil 80. This cooling circuit 81 works by collecting the leading edge post impingement air within the impingement cooling circuit 82 in a radial channel 94 aft of the insert 84 which flows radially from the tip 92 to the hub 93 of the airfoil 80 (see FIG. 6). Several horseshoe shaped ribs (not shown) may be optionally added to inner surface of the leading edge 86 of the airfoil 80 in order to create channels which direct the post impingement air axially into the radial channel 94 and limit the radial flow of air in the cavity 85. Some pre-impingement cooling air may be directed outward through an orifice 97 to form a stream 96 of pre-impingement cooling air for rotor purge or other uses as desired.

Figure 3:
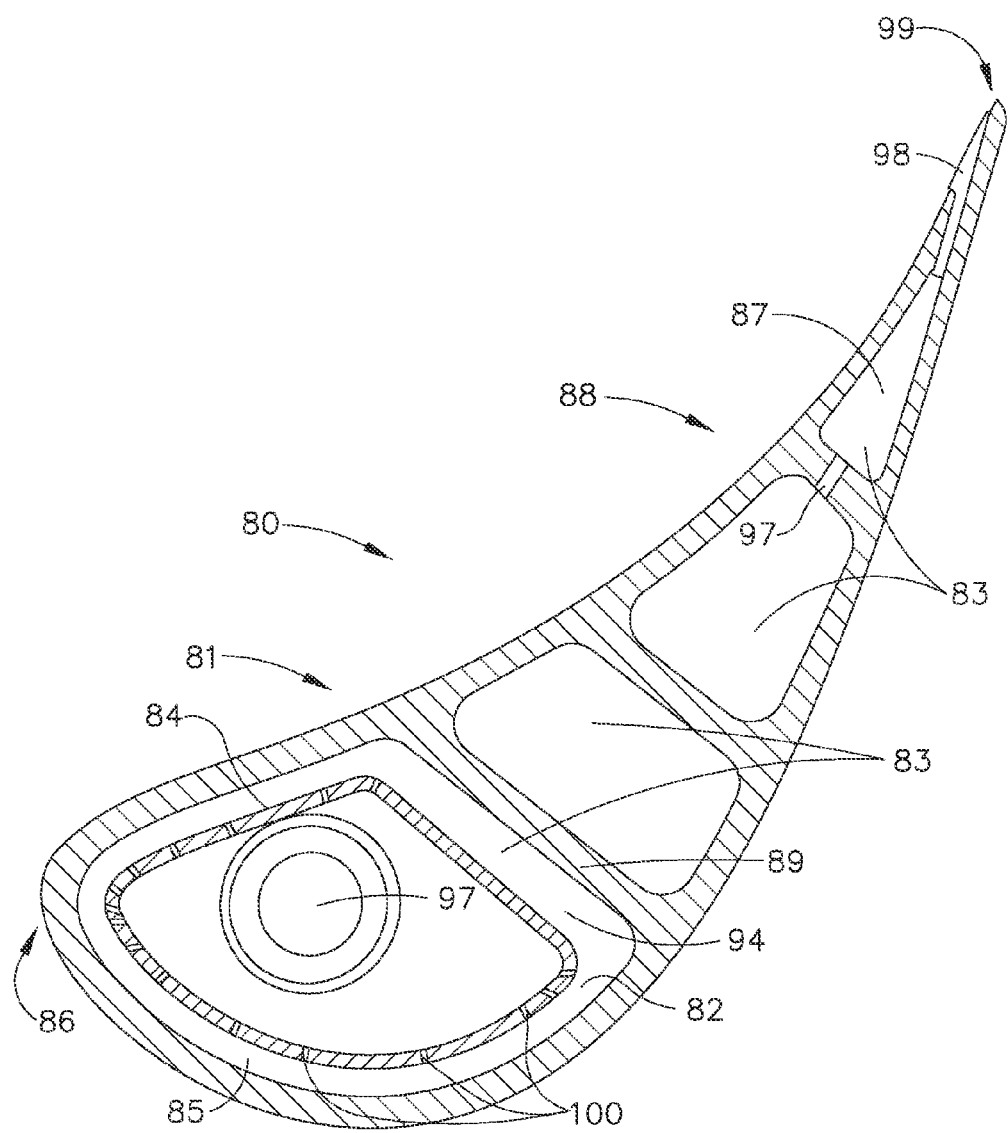
FIG. 3 is a cross-sectional illustration of the airfoil of FIG. 2 taken along line 3-3.
Figure 4:
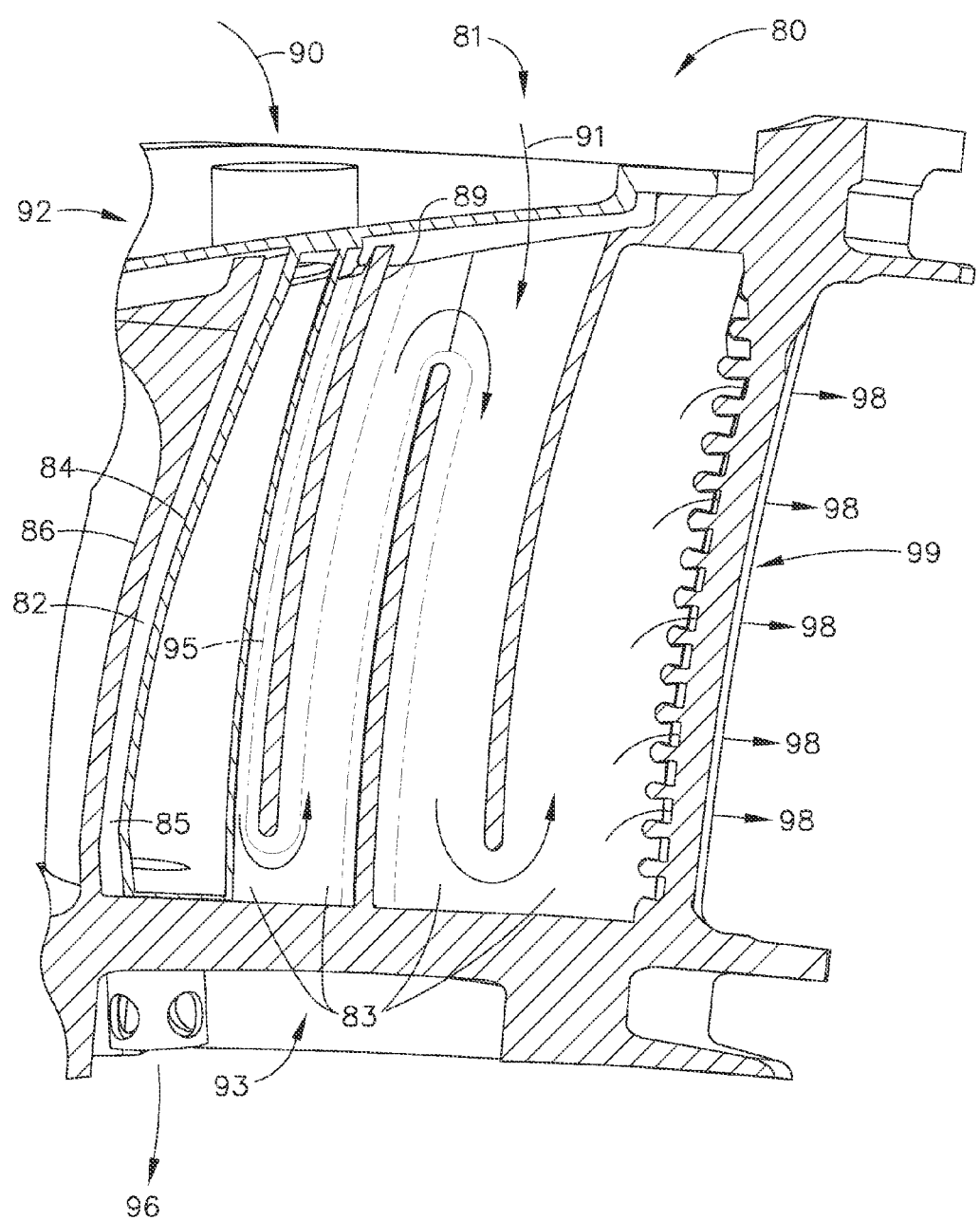
FIG. 4 is a cross-sectional elevational illustration of the airfoil of FIG. 2.
Figure 6:
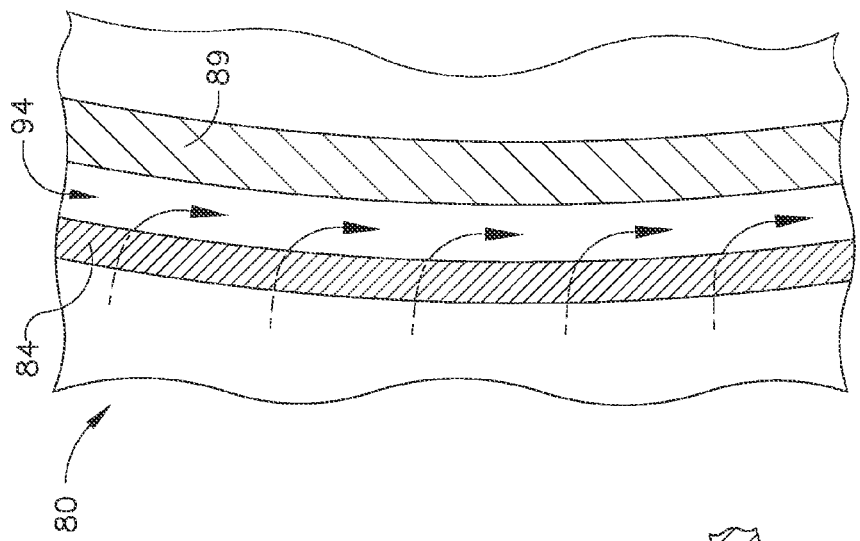
FIG. 6 is an enlarged partial elevational sectional illustration similar to FIG. 4 of the airfoil of FIG. 2.
Figure 5:
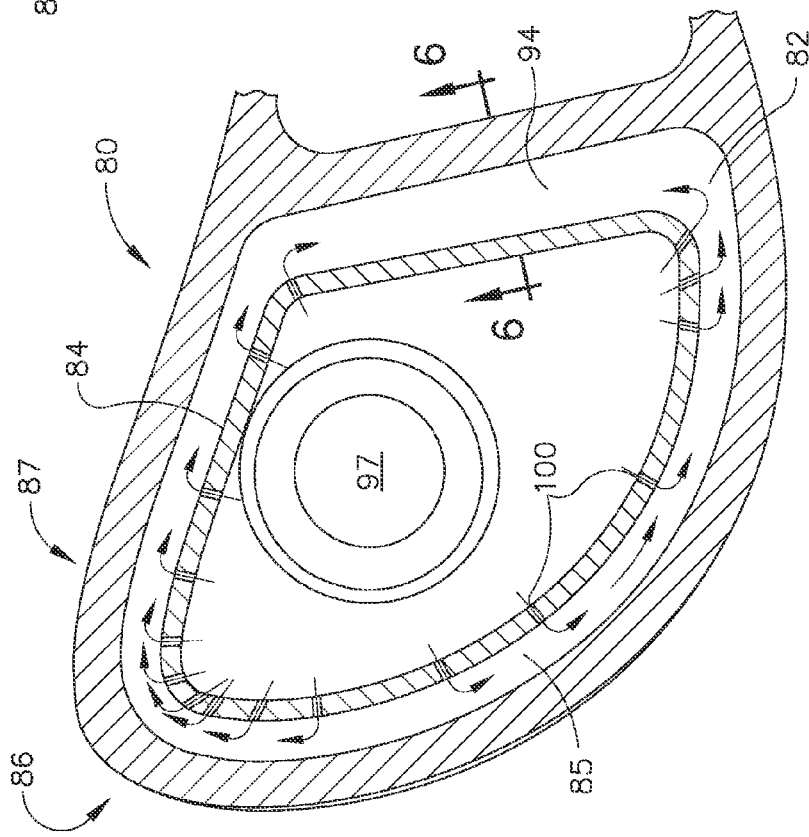
FIG. 5 is an enlarged partial cross-sectional illustration similar to FIG. 3 of the airfoil of FIG. 2.

Near the hub the post impingement air makes a turn into the first pass of a serpentine circuit 83 (see FIG. 4). The impingement cooling circuit 81 and the serpentine cooling circuit 83 are in fluid communication and cooling air flows from the impingement cooling circuit 81 to the serpentine cooling circuit 83. There can be any number of cavities in the serpentine circuit 83, thereby forming a serpentine or tortuous path within the interior airfoil to guide cooling air through the airfoil in contact with the various interior surfaces. In the embodiment shown in FIG. 3, the serpentine circuit 83 has three cavities (counting the channel 94) resulting in two 180 degree changes in flow direction. In the embodiment shown in FIG. 4, the serpentine circuit 83 has four cavities (counting the channel 94) resulting in three 180 degree changes in flow direction. In the last radial flow cavity, nearest the trailing edge 99 of the airfoil 80, the air either flows through crossover holes 97 to a collection cavity 87 which then feeds trailing edge slots or holes 98 (as shown in FIG. 3), feeds the slots 98 directly (as shown in FIG. 4), or can be used with other trailing edge cooling configurations. A refresher hole 91 can be added at either the hub 93 or the tip 92 of the airfoil 80 (see FIG. 4) in order to add cooler air from the coolant source as well as additional flow to the remainder of the serpentine cooling circuit 83. Film holes may be placed at the end of the serpentine circuit to drag more flow through the end portion and maintain convective cooling inside the circuit.

The airfoil cooling circuit described herein, and illustrated in the accompanying Figures of exemplary embodiments, combines the best features of the two different cooling circuit approaches in a way that maintains the cooling intent and robustness of both designs. With conventional dual insert cooled airfoils, the middle portion cooled by the second insert often tends to be much cooler than the leading edge and trailing edge of the airfoil. With the exemplary embodiments described herein, the serpentine cooling circuit generates a more consistent cooling effectiveness across the center and aft portion of the airfoil, reducing the temperature gradient from leading edge to middle portion of the airfoil, and from middle portion of the airfoil to trailing edge.

A possible commercial advantage of cooling circuits described herein would be lower airfoil cooling flow which would improve engine specific fuel consumption. A technical advantage of this design would be the decreased temperature gradient across the airfoil which would yield lower engine operating airfoil stress and improve part life and durability.

A design using a mixture of pre-impingement and post-impingement air to feed the serpentine from the insert could be accomplished. Different configurations of the interface between the trailing edge slots and the aft portion of the serpentine could also be considered. Multiple inserts feeding the serpentine could be used (for example, two cavities with impingement air which flow into the same serpentine). Some sort of serpentine circuit which incorporates a portion of the flow going axially instead of radially could also be employed. An axial flow serpentine could be designed to use the post impingement air instead of a radial one.

While the invention has been described in terms of various specific embodiments, those skilled in the art will recognize that the invention can be practiced with modification within the spirit and scope of the claims.

What is claimed is:

1. An airfoil cooling circuit comprising:
   an impingement cooling circuit;
   a serpentine cooling circuit;
   cooling air;
   a first cooling air inlet proximate an airfoil leading edge; and
   a second cooling air inlet positioned between the airfoil leading edge and an airfoil trailing edge;
   wherein incoming cooling air first enters the airfoil proximate the airfoil tip;
   wherein a first portion of the cooling air entering through the first cooling air inlet is directed through an orifice to form a stream of pre-impingement cooling air for rotor purge at a radially inward hub, and
   wherein a second portion of the cooling air entering through the first cooling air inlet is directed to the impingement cooling circuit.

2. An airfoil cooling circuit according to claim 1, wherein said impingement cooling circuit includes an insert having a plurality of impingement holes, the insert further comprising;
   a first radially-oriented wall having a plurality of impingement holes configured to direct cooling air to impinge on the interior of a pressure side airfoil wall proximate the airfoil leading edge, the first radially-oriented wall being substantially linear;
   a second radially-oriented wall having a plurality of impingement holes configured to direct cooling air to impinge on the interior of a suction side airfoil wall proximate the airfoil leading edge, the second radially-oriented wall being curved; and
   a third radially-oriented wall free of impingement holes, the third radially-oriented wall being substantially linear, the three radially-oriented walls being connected along radially oriented joints to form the insert;
   wherein the third radially-oriented wall forms a channel with a rib, the rib stretching from an airfoil pressure side to an airfoil suction side;
   wherein the channel delivers post impingement air in a radially inward direction to the inlet of the serpentine circuit.

3. An airfoil cooling circuit according to claim 1, wherein said serpentine cooling circuit includes a refresher hole.

4. An airfoil cooling circuit according to claim 1, wherein said serpentine cooling circuit includes a collection cavity for feeding a plurality of trailing edge slots.

5. An airfoil cooling circuit according to claim 1, wherein said serpentine cooling circuit directly feeds a plurality of trailing edge slots.

6. An airfoil cooling circuit according to claim 1, wherein said serpentine cooling circuit includes at least two 180 degree changes of flow direction.

7. An airfoil cooling circuit according to claim 1, wherein said serpentine cooling circuit is free from impingement features.

8. An airfoil cooling circuit according to claim 1, wherein said impingement cooling circuit and said serpentine cooling circuit are in fluid communication and cooling air flows from said impingement cooling circuit to said serpentine cooling circuit.

9. An airfoil for use in a gas turbine engine, said airfoil having a cooling circuit comprising:
an impingement cooling circuit;
a serpentine cooling circuit;
cooling air;
an insert having a plurality of impingement holes; the insert further comprising;
  a first radially-oriented wall having a plurality of impingement holes configured to direct cooling air to impinge on the interior of a pressure side airfoil wall proximate the airfoil leading edge, the first radially-oriented wall being substantially linear;
  a second radially-oriented wall having a plurality of impingement holes configured to direct cooling air to impinge on the interior of a suction side airfoil wall proximate the airfoil leading edge, the second radially-oriented wall being curved; and
  a third radially-oriented wall free of impingement holes, the third radially-oriented wall being substantially linear, the three radially-oriented walls being connected along radially oriented joints to form the insert;
wherein the third radially-oriented wall forms a channel with a rib, the rib being radially oriented and stretching from an airfoil pressure side to an airfoil suction side;
wherein the channel delivers post impingement air in a radially inward direction to the inlet of the serpentine circuit;
a first cooling air inlet proximate an airfoil leading edge; and
a second cooling air inlet positioned between the airfoil leading edge and an airfoil trailing edge;
wherein incoming cooling air first enters said airfoil proximate the airfoil tip,
wherein said serpentine cooling circuit is free from impingement features,
wherein a first portion of the cooling air entering through the first cooling air inlet is directed through an orifice to form a stream of pre-impingement cooling air for rotor purge at a radially inward hub, and
wherein a second portion of the cooling air entering through the first cooling air inlet is directed to the impingement cooling circuit.

10. An airfoil according to claim 9, wherein the orifice is radially oriented and is positioned inside the insert.

11. An airfoil according to claim 10, wherein said serpentine cooling circuit includes a crossover hole, and wherein the second cooling air inlet delivers pre-impingement cooling air to the serpentine circuit via a refresher hole, wherein the pre-impingement cooling air mixes with the post-impingement cooling air in the serpentine circuit proximate the airfoil tip.

12. An airfoil according to claim 9, wherein said serpentine cooling circuit includes three 180 degree changes of flow direction.

13. An airfoil according to claim 9, wherein said serpentine cooling circuit includes a collection cavity for feeding a plurality of trailing edge slots.

14. An airfoil according to claim 9, wherein said serpentine cooling circuit directly feeds a plurality of trailing edge slots.

15. An airfoil according to claim 9, wherein said serpentine cooling circuit includes at least two 180 degree changes of flow direction.

16. An airfoil according to claim 9, wherein said cooling air in said serpentine cooling circuit includes a mixture of pre-impingement and post-impingement air, wherein said pre-impingement air enters the airfoil through said second cooling air inlet.

17. An airfoil according to claim 9, wherein said airfoil is a turbine vane.

18. An airfoil according to claim 16, wherein said serpentine cooling circuit includes an orifice, wherein a portion of said pre-impingement air is directed through said orifice to be used as purge air.

19. An airfoil according to claim 9, wherein said impingement cooling circuit and said serpentine cooling circuit are in fluid communication and cooling air flows from said impingement cooling circuit to said serpentine cooling circuit.

20. A turbine airfoil for use in a gas turbine engine, said airfoil having a leading edge, a trailing edge, and a plurality of internal cavities between said leading edge and said trailing edge, said cooling circuit comprising:
a first cooling air inlet proximate the leading edge;
a second cooling air inlet positioned between the leading edge and the trailing edge;
an impingement cooling circuit disposed in an internal cavity near said leading edge and including an insert having a plurality of impingement holes; and
a serpentine cooling circuit disposed in a plurality of internal cavities forming a serpentine path with at least two 180 degree changes of flow direction;
wherein said impingement cooling circuit and said serpentine cooling circuit are in fluid communication and cooling air flows from said impingement cooling circuit to said serpentine cooling circuit,
wherein incoming cooling air first enters said airfoil proximate the airfoil tip,
wherein a first portion of the cooling air entering through the first cooling air inlet is directed through an orifice to form a stream of pre-impingement cooling air for rotor purge at a radially inward hub, and
wherein a second portion of the cooling air entering through the first cooling air inlet is directed to the impingement cooling circuit.

* * * * *